United States Patent
Parts et al.

(10) Patent No.: US 8,027,355 B2
(45) Date of Patent: Sep. 27, 2011

(54) RESOURCE ALLOCATION METHOD AND SYSTEM

(75) Inventors: Ülo Parts, Helsinki (FI); Mika Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 849 days.

(21) Appl. No.: 12/073,226

(22) Filed: Mar. 3, 2008

(65) Prior Publication Data

US 2008/0225787 A1    Sep. 18, 2008

(30) Foreign Application Priority Data

Mar. 5, 2007 (FI) .................................. 20075157

(51) Int. Cl.
*H04J 4/00* (2006.01)
(52) U.S. Cl. .................. 370/436; 370/321; 370/344
(58) Field of Classification Search .............. 370/319, 370/321, 343–348, 436, 480
See application file for complete search history.

(56) References Cited

U.S. PATENT DOCUMENTS

| | | |
|---|---|---|
| 2006/0007849 A1 | 1/2006 | Kim et al. |
| 2006/0077885 A1* | 4/2006 | Schnell et al. ............ 370/203 |
| 2006/0126749 A1 | 6/2006 | Armour et al. |
| 2007/0092014 A1* | 4/2007 | Kim et al. ............... 375/260 |

FOREIGN PATENT DOCUMENTS

EP    1 653 646 A1    5/2006

OTHER PUBLICATIONS

Cheong Yui Wong, et al., "Multiuser OFDM with Adaptive Subcarrier, Bit, and Power Allocation," IEEE Journal on Selected Areas in Communications, vol. 17, No. 10, Oct. 1999, pp. 1747-1758.
PCT International Search Report, International Appln. No. PCT/FI2008/050104, Date of Mailing: Jun. 9, 2008, pp. 1-4.

* cited by examiner

*Primary Examiner* — Phuc Tran
(74) *Attorney, Agent, or Firm* — Squire, Sanders & Dempsey (US) LLP (57) ABSTRACT

There is provided a communication system, comprising a network infrastructure comprising: a transmitter configured to transmit signaling information to user terminals, the signaling information being related to the allocation of the plurality of sub-carriers at a common frequency band used for data transmission between the multiple user terminals and a network infrastructure; a processor configured to divide the common frequency band into two suppression bands at the edge zones of the common frequency band and to provide a safe band between the two suppression bands, the two suppression bands including sub-carriers having a predetermined amount of decreased channel estimation accuracy compared with the other sub-carriers of the common frequency band; and a processor configured to allocate signaling information, related to the allocation of at least one sub-carrier to a user terminal having an expected signal to interference-plus-noise ratio at a predetermined level, to at least one sub-carrier included in the safe band.

37 Claims, 5 Drawing Sheets

RESOURCE ALLOCATION METHOD AND SYSTEM

FIELD

The invention relates to a resource allocation method, to a communication system, to a network element, to a user terminal, and to a computer-readable program distribution medium.

BACKGROUND

In known communication systems, such as systems based on orthogonal frequency division multiple access (OFDMA), a common frequency band is shared among many user terminals. The user terminals often monitor the shared channel resources of the system in order to transmit and receive data efficiently. The user terminals receive signaling information related to allocation of the user terminals to specific resources of the common frequency band for transmission and/or reception. An Allocation Table or a corresponding control channel (e.g. a shared control channel) is used to describe the allocation of user data both in downlink and uplink. The Allocation Table can be sent once per a short period of time, i.e. a subframe of transmission time interval (TTI), for example. This is important in order to control packet-switched traffic and the scheduling thereof efficiently.

In a known system, the Allocation Table is transmitted as one self-decodable block for all user terminals. As the block is transmitted over the whole bandwidth, it benefits from the available frequency diversity. However, such a block should be coded and modulated taking into account the lowest signal to interference-plus-noise ratio (SINR) requirements. The performance in such a case is not satisfactory at low SINR and it also consumes radio resources excessively due to a large Information Block length and a low channel-coding rate.

Some methods have been proposed for improving the performance of control channel reception. First, instead of one decodable block the user terminals can be divided into several groups according to their reported SINR. Then, a modulation and coding rate of such blocks can be adjusted respectively. The Allocation Table for user terminals in difficult signal conditions can be coded with low code rate and low order modulation. Further, the transmitted power of the blocks can be differentiated such that higher power is allocated to user terminals having low SINR for improving the reliability in that area. The blocks can be allocated not only as chunk of consecutive sub-carriers but also in a distributed (scattered) manner so that all separately decodable blocks also benefit from frequency diversity. Further, as an alternative, the shared control channel may be arranged as a set of self-decodable information blocks, each of which is intended for a user terminal separately. This kind of shared channel has roughly the same properties as the Allocation Table described above but with a receiver-specific power control (power boosting/power suppression), code rate selection and smaller Information Block Length. Also in this case, the code blocks are distributed (scattered) over a frequency to benefit from frequency diversity.

Receiving of the Allocation Table (i.e. the allocation information) is important because if a user terminal does not succeed in that, it cannot receive any data either. The probability of receiving the Allocation Table should be good in order to guarantee good capacity of the particular radio link. The reception should also work well with a low SINR. Especially at low SINR values, it is difficult to achieve reliable reception of allocation information.

BRIEF DESCRIPTION OF THE INVENTION

An object of the invention is to provide an improved resource allocation method, a communication system, a network element, a user terminal, and a computer-readable program distribution medium.

According to an aspect of the invention, there is provided a method, comprising: sharing a common frequency band by multiple user terminals, the common frequency band including a plurality of sub-carriers; providing signaling information related to the allocation of the plurality of sub-carriers to the user terminals; dividing the common frequency band into two suppression bands at the edge zones of the common frequency band and providing a safe band between the two suppression bands, the two suppression bands including sub-carriers having a predetermined amount of decreased channel estimation accuracy compared with the other sub-carriers of the common frequency band; and processing signaling information, related to the allocation of at least one sub-carrier to a user terminal having an expected signal to interference-plus-noise ratio at a predetermined level, on at least one sub-carrier included in the safe band.

According to another aspect of the invention, there is provided a communication system, comprising a network infrastructure comprising: a transmitter configured to transmit signaling information to user terminals, the signaling information being related to the allocation of the plurality of sub-carriers at a common frequency band used for data transmission between the multiple user terminals and the network infrastructure; a processor configured to divide the common frequency band into two suppression bands at the edge zones of the common frequency band and to provide a safe band between the two suppression bands, the two suppression bands including sub-carriers having a predetermined amount of decreased channel estimation accuracy compared with the other sub-carriers of the common frequency band; and a processor configured to allocate signaling information, related to the allocation of at least one sub-carrier to a user terminal having an expected signal to interference-plus-noise ratio at a predetermined level, to at least one sub-carrier included in the safe band.

According to another aspect of the invention, there is provided an apparatus, comprising: a transmitter configured to transmit signaling information to user terminals, the signaling information being related to the allocation of the plurality of sub-carriers at a common frequency band used for data transmission between the multiple user terminals and a network infrastructure; a processor configured to divide the common frequency band into two suppression bands at the edge zones of the common frequency band and to provide a safe band between the two suppression bands, the two suppression bands including sub-carriers having a predetermined amount of decreased channel estimation accuracy compared with the other sub-carriers of the common frequency band; and a processor configured to allocate signaling information, related to the allocation of at least one sub-carrier to a user terminal having an expected signal to interference-plus-noise ratio at a predetermined level, to at least one sub-carrier included in the safe band.

According to another aspect of the invention, there is provided an apparatus, comprising a receiver configured to receive signaling information related to the allocation of a plurality of sub-carriers of a common frequency band, where the common frequency band is divided into two suppression bands at the edge zones of the common frequency band and a safe band is provided between the two suppression bands, the two suppression bands including sub-carriers having a predetermined amount of decreased channel estimation accuracy compared with the other sub-carriers of the common frequency band; and to receive signaling information allocated to at least one sub-carrier included in the safe band when the user terminal has an expected signal to interference-plus-noise ratio at a predetermined level.

According to another aspect of the invention, there is provided a computer-readable program distribution medium encoding a computer program of instructions for executing a computer process for resource allocation. The process comprises: sharing a common frequency band by multiple user terminals, the common frequency band including a plurality of sub-carriers; providing signaling information related to the allocation of the plurality of sub-carriers to the user terminals; dividing the common frequency band into two suppression bands at the edge zones of the common frequency band and providing a safe band between the two suppression bands, the two suppression bands including sub-carriers having a predetermined amount of decreased channel estimation accuracy compared with the other sub-carriers of the common frequency band; and processing signaling information, related to the allocation of at least one sub-carrier to a user terminal having an expected signal to interference-plus-noise ratio at a predetermined level, on at least one sub-carrier included in the safe band.

According to another aspect of the invention, there is provided a communication system, comprising a network infrastructure comprising: transmitting means for transmitting signaling information to user terminals, the signaling information being related to the allocation of the plurality of sub-carriers at a common frequency band used for data transmission between the multiple user terminals and the network infrastructure; processing means for dividing the common frequency band into two suppression bands at the edge zones of the common frequency band and for providing a safe band between the two suppression bands, the two suppression bands including sub-carriers having a predetermined amount of decreased channel estimation accuracy compared with the other sub-carriers of the common frequency band; and processing means for allocating signaling information, related to the allocation of at least one sub-carrier to a user terminal having an expected signal to interference-plus-noise ratio at a predetermined level, to at least one sub-carrier included in the safe band.

According to another aspect of the invention, there is provided an apparatus, comprising: transmitting means for transmitting signaling information to user terminals, the signaling information being related to the allocation of the plurality of sub-carriers at a common frequency band used for data transmission between the multiple user terminals and a network infrastructure; processing means for dividing the common frequency band into two suppression bands at the edge zones of the common frequency band and for providing a safe band between the two suppression bands, the two suppression bands including sub-carriers having a predetermined amount of decreased channel estimation accuracy compared with the other sub-carriers of the common frequency band; and processing means for allocating signaling information, related to the allocation of at least one sub-carrier to a user terminal having an expected signal to interference-plus-noise ratio at a predetermined level, to at least one sub-carrier included in the safe band.

According to another aspect of the invention, there is provided an apparatus, comprising: receiving means for receiving signaling information related to the allocation of a plurality of sub-carriers of a common frequency band, where the common frequency band is divided into two suppression bands at the edge zones of the common frequency band and a safe band is provided between the two suppression bands, the two suppression bands including sub-carriers having a predetermined amount of decreased channel estimation accuracy compared with the other sub-carriers of the common frequency band; and receiving means for receiving signaling information allocated to at least one sub-carrier included in the safe band when the user terminal has an expected signal to interference-plus-noise ratio at a predetermined level.

The invention provides several advantages. The receiving of sub-carrier allocation information is improved even with low expected SINR values. The required transmission power can be decreased and higher modulation and coding schemes can be provided for users in difficult channel conditions. Spectral mask requirements can be achieved more easily and adjacent channel leakage power to receivers operating in adjacent frequencies can be reduced. Selected channel coding rate can be changed from a lower rate to a higher rate, thus saving transmission resources consumed for a signaling overhead.

LIST OF DRAWINGS

In the following, the invention will be described in greater detail with reference to the embodiments and the accompanying drawings, in which.

DESCRIPTION OF EMBODIMENTS

In the following, various embodiments of the invention will be described based on a wireless cellular transmission system, such as evolved UTRA (E-UTRA). The embodiments are not limited for use with only this one particular type of wireless communication system, and they may be used in connection with other wireless communication systems such as wireless ad hoc networks, cognitive radios, fourth generation (4G) systems, and beyond third generation (B3G) systems and, as non-limiting examples.

Figure 1A:
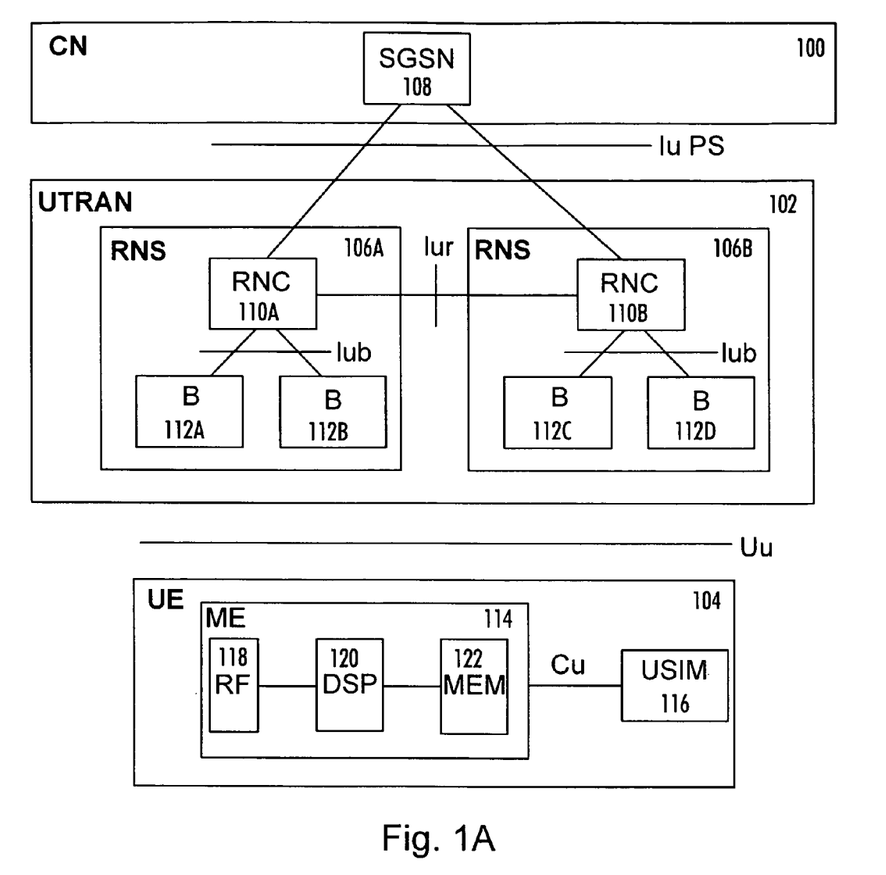
FIGS. 1A and 1B show examples of wireless communications systems.

FIG. 1A illustrates an example of a wireless communications system to which the present solution may be applied. Below, some embodiments of the invention will be described using the UMTS (Universal Mobile Telecommunications System) as an example of the wireless communication systems. The invention may, however, be applied to any wireless communication system that supports OFDMA system elements. The structure and functions of such a wireless communication system and those of the associated network elements are only described when relevant to the invention. It is obvious that for a multi-carrier signal generation other transforms comparable to FFT and DFT transforms used in OFDM are available as well. These may include cosine, sine, exponential, lapped, polyphase and wavelet transforms, for example.

The wireless communication system may be divided into a core network (CN) 100, a UMTS terrestrial radio access network (UTRAN) 102, and user terminal (UE) 104. The core network 100 and the UTRAN 102 compose a network infrastructure of the wireless communication system.

The UTRAN 102 is typically implemented with wideband code division multiple access (WCDMA) radio access technology.

The core network 100 includes a serving GPRS support node (SGSN) 108 connected to the UTRAN 102 over an Iu PS interface. The SGSN 108 represents the center point of the packet-switched domain of the core network 100. The main task of the SGSN 108 is to transmit packets to the user terminal 104 and to receive packets from the user terminal 104 by using the UTRAN 102. The SGSN 108 may contain subscriber and location information related to the user terminal 104.

The UTRAN 102 includes radio network sub-systems (RNS) 106A, 106B, each of which includes at least one radio network controller (RNC) 110A, 110B and nodes B 112A, 112B, 112C, 112D.

Some functions of the radio network controller 110A, 110B may be implemented with a digital signal processor, memory, and computer programs for executing computer processes. The basic structure and operation of the radio network controller 110A, 110B are known to one skilled in the art and only the details relevant to the present solution are discussed in detail.

The node B 112A, 112B, 112C, 112D implements the Uu interface, through which the user terminal 104 may access the network infrastructure. Some functions of the base station 112A, 112B, 112C, 112D may be implemented with a digital signal processor, memory, and computer programs for executing computer processes. The basic structure and operation of the base station 112A, 112B, 112C, 112D are known to one skilled in the art and only the details relevant to the present solution are discussed in detail.

The user terminal 104 may include two parts: mobile equipment (ME) 114 and a UMTS subscriber identity module (USIM) 116. The mobile equipment 114 typically includes radio frequency parts (RF) 118 for providing the Uu interface. The user terminal 304 further includes a digital signal processor 120, memory 122, and computer programs for executing computer processes. The user terminal 104 may further comprise an antenna, a user inter-face, and a battery not shown in FIG. 1. The USIM 116 comprises user-related information and information related to information security in particular, for instance, an encryption algorithm.

Figure 1B:
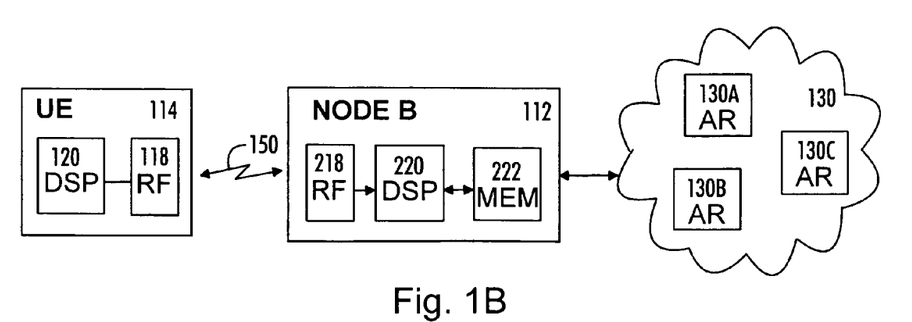

FIG. 1B shows another example of a wireless communication system. The wireless communication system comprises a user terminal (UE) 114 and a base station 112. The user terminal 114 may be connected to the base station over a wireless link 150. The radio access system is connected to a packet network 130 consisting of Access Routers (AR) 130A, 130B, 130C. Such a configuration may also include one or more wireless local area networks (WLAN) as radio access technology. The local area network may communicate with the base station 112 using wireless and or wire connections or via the packet network 130.

Figure 2:
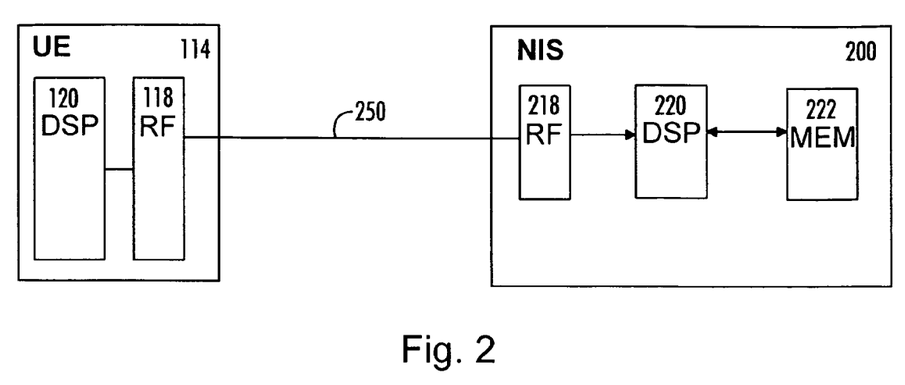
FIG. 2 illustrates another example of a communications system.

FIG. 2 shows another example of a wireless communication system. The wireless communication system comprises a network infrastructure (NIS) 200 and a user terminal (UE) 114. The user terminal 114 may be connected to the network infrastructure 200 over a physical data channel, such as a DPDCH (Dedicated Physical Data channel) defined in the 3GPP specification.

An uplink control channel, such as an uplink DPCCH (Dedicated Physical Control Channel) defined in the 3GPP (3rd Generation Partnership Project) specification, transmitted by the user terminal 114 includes pilot sequences. The network infrastructure 200 encodes the pilot sequences and estimates signal quality parameters, such as SIR (Signal-to-Interference Ratio), of the uplink DPCCH.

The network infrastructure 200 comprises a transmitting/receiving unit 218, which carries out channel encoding/decoding and modulation of transmission signals, converts them from/to the baseband to/from the transmission frequency band and amplifies the transmission signals. The signal processor DSP 220 controls the operation of the network element and evaluates signals received via the transmitting/receiving unit 218. Data about the transmission and switching times and specific characteristics of the connections are stored in a memory 222.

In FIG. 2, a single user terminal 114 is shown. However, it is assumed that there are several user terminals 114 that share a common frequency band for communicating with the network infrastructure 200. The SINR over the communication bandwidth has a frequency selective nature, which different user terminals experience differently.

The network infrastructure 200 measures signals in the uplink direction. The resource request from the user terminal 114 is thus recognized, for example by node B. The decision is made whether it is possible to allocate resources to the user terminal 114. If, for example, an adequate signal-to-noise ratio is detected, then the user terminal 114 is allocated a frequency band via an allocation channel 250.

Information in the communications system is transmitted by using transmission resources that may comprise radio frames, symbols in a frame or data blocks on a shared channel. Allocation of the transmission resources for the user terminals is defined by allocation information. The allocation information can be referred to as an Allocation Table (or a corresponding control channel structure) comprising a table (or a set of tables) of frequency allocations of a user data in uplink and downlink. A piece of information included in the Allocation Table is referred to as signaling information or allocation information in connection with some embodiments described below. The user terminal 114 monitors allocation information and may determine which part of the transmission resources contains a resource allocated to this user terminal 114 at least in one of downlink or uplink. Allocation information may contain various other details, such as the order, duration, size and transport format of the allocated resources. A piece of allocation information can also be associated with a group of user terminals. In the embodiments of the invention, the Allocation Table corresponds to any arrangement of control channel code blocks, which includes signaling information at least for a receiver terminal. Thus, the Allocation Table may relate for example to joint coding (all information), grouped coding (information for several terminals but not all), and/or separate coding (information for individual terminals).

In an embodiment, the radio resources allocation is carried out in the network infrastructure 200, such as a network element (e.g. node B). The processor 220 is configured to provide signaling information related to the allocation of a plurality of sub-carriers of the common frequency band to the user terminals. The processor 220 is further configured to divide the common frequency band (in power domain) into two suppression bands at the edge zones of the common frequency band and to provide a safe band between the two suppression bands, the two suppression bands including sub-carriers having a predetermined amount of decreased channel estimation accuracy compared with the other sub-carriers of the common frequency band. Further, the processor 220 is configured to allocate signaling information, related to the allocation of at least one sub-carrier to a user terminal having an expected signal to interference-plus-noise ratio at a predetermined level, to at least one sub-carrier included in the safe band.

In an embodiment, the notations of suppression band and safe band apply to the signal in power domain only such that the signal is processed in transform domain over the whole common frequency band, but the sub-carrier symbols for demodulating are allocated taking into account the sub-carrier power properties of each band (suppression band or safe band), respectively.

In an embodiment, the division of the common frequency band into two suppression bands and providing the safe band between them follows a smooth weighting function over the sub-carriers. Thus, it is not necessary to have a hard limit for the sub-carriers that belong to the safe band and/or for the sub-carriers that belong to the suppression band.

In an embodiment, the processor 220 is configured to allocate signaling information for a user terminal having an expected signal to interference-plus-noise ratio below a predetermined threshold to at least one sub-carrier included in the safe band. Further, in another embodiment, the processor 220 is configured to allocate signaling information for a user terminal having an expected signal to interference-plus-noise ratio above a predetermined threshold to a set of sub-carriers included at least partly in a suppression band.

Thus, at least part of the signaling information related to the allocation of at least one sub-carrier to a user terminal having an expected signal to interference-plus-noise ratio above a predetermined threshold can be allocated to one or more sub-carriers included at least partly in a suppression band. The aforementioned thresholds may each be subject to link adaptation or transport format selection for the signaling information. Thus, the thresholds may actually form sets of tunable thresholds respectively. Further, the suppression band, the safe band and thresholds need not be defined as discrete sets, but any weighting function, smoothing function, polynomial, sigmoid or piece-wise defined formula may be applied to define the differing behavior over the mentioned bands according to the invention. In case of separately coded signaling blocks, the choice of modulated sub-carriers can be made similarly for each of the code block comparably to the choice of modulated sub-carriers of a code block carrying information to more than one receiver terminals.

In an embodiment, an additional restriction is added to the mapping of the Allocation Table to the user terminals having a low expected SINR. A threshold value can be determined in advance. The SINR of the user terminal is then compared with the threshold value and if the SINR is below it, the allocation information for that user terminal is allocated to at least one sub-carrier included in the safe band. In an embodiment, a scheduling algorithm for localized allocations based on frequency selective SINR estimates may include a correction factor (or a negative bias) to the sub-carriers of physical resource blocks on the suppression bands. In case the instantaneous load is not full, it is possible to deliberately avoid any transmission on the sub-carriers on the suppression bands.

In an embodiment, the parts (e.g. a code block) of an Allocation Table containing signaling information for the user terminals with non-satisfactory channel conditions are not allocated to the sub-carriers that are close to the band edges, e.g. about 30-50 sub-carriers from the edge of the band. The embodiments can be applied to bandwidths higher than 5 MHz of EUTRAN (Enhanced UTRAN), for example. In an embodiment, the number of sub-carriers included in the suppression bands can be determined on the basis of a channel estimation algorithm. In another embodiment, there can be a defined range of sub-carriers in which the measure of channel estimation inaccuracy is known as a function of the channel propagation properties. This measure may depend on the channel estimation algorithm used.

In an embodiment, even though part of the Allocation table information is allocated to one or more sub-carriers of the safe band, user terminals with satisfactory channel conditions may still receive allocation information in the sub-carriers of the suppression bands.

In an embodiment, a correction factor or a bias is calculated to the channel estimation process and that update is then applied in the allocation control. Thus, the decision about the allocations may be made on the basis of the calculated correction factor and/or the bias.

Figure 3:
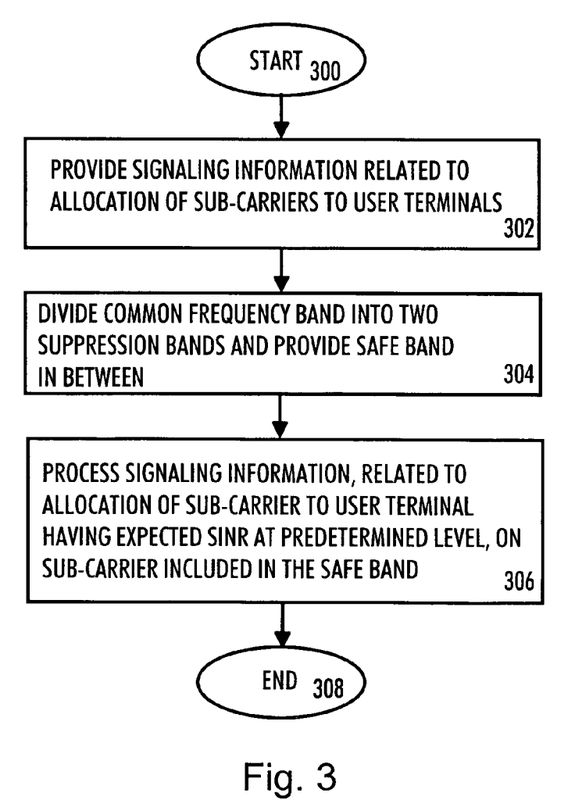
FIG. 3 shows a flow chart of a resource allocation method.

FIG. 3 shows a flowchart of a resource allocation method according to an embodiment of the invention. The method starts in 300. Multiple user terminals share a common frequency band including a plurality of sub-carriers. In 302, signaling information related to the allocation of the plurality of sub-carriers is provided to the user terminals. In 304, the common frequency band is divided into two suppression bands at the edge zones of the common frequency band and a safe band is provided between the two suppression bands, the two suppression bands including sub-carriers having a predetermined amount of decreased channel estimation accuracy compared with the other sub-carriers of the common frequency band. In 306, signaling information, related to the allocation of at least one sub-carrier to a user terminal having an expected signal to interference-plus-noise ratio at a predetermined level, is processed on at least one sub-carrier included in the safe band. The method ends in 308.

Thus, the signaling information for a user terminal having an expected signal to interference-plus-noise ratio below a predetermined threshold can be allocated to at least one sub-carrier included in the safe band. Further, in another embodiment, the signaling information for a user terminal having an expected signal to interference-plus-noise ratio above a predetermined threshold can be allocated to a set of sub-carriers included at least partly in a suppression band.

The channel estimation errors are clearly larger at the band edges with constant pilot density as a function of frequency (as constant pilot density is agreed in 3GPP). The embodiments of the invention improve link budget (i.e. decreases the required transmission power or allow higher modulation and coding) for allocation information transmission to the user terminals in difficult channel conditions.

Figure 4:
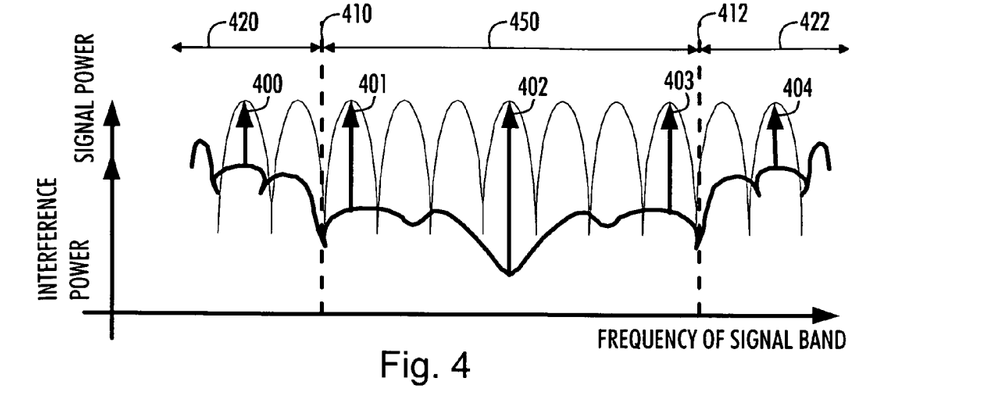
FIG. 4 illustrates the variation of a sub-carrier signal-to-interference plus noise power over the system bandwidth.

FIG. 4 illustrates the variation of the sub-carrier signal-to-interference plus noise power over the system bandwidth, experienced by a receiver terminal. The x axis represents the frequency of the signal band and the y axis represents the signal power and the interference power. The curve point 400 illustrates the value of SINR of $k-5^{th}$ sub-carrier, the curve point 401 illustrates the value of SINR of $k-3^{th}$ sub-carrier, the curve point 402 illustrates the value of SINR of $k^{th}$ sub-carrier, the curve point 403 illustrates the value of SINR of $k+3^{th}$ sub-carrier and the curve point 404 illustrates the value of SINR of $k+5^{th}$ sub-carrier. It can be seen that the SINR values are clearly lower when approaching to the edges of the frequency band. Actually, each receiver terminal individually monitors the frequency-selective and dynamic SINR over the communication bandwidth, which depends e.g. on the propagation environment (location and structure of the scatterers), location of the user terminal in the area relative to the base stations, user terminal velocity and user terminal receiver techniques.

The dashed lines 410, 412 of FIG. 4 illustrate borders between the safe band and the two suppression bands. The area between the two dashed lines 410, 412 illustrates the safe band 450, and the areas at the edges of the frequency band illustrate the two suppression bands 420, 422. In this example, the curve points 401, 402 and 403 represent the SINR values of the safe band 450, and the curve points 400 and 404 represent the SINR values of the suppression bands 420, 422, respectively.

Figure 5A:
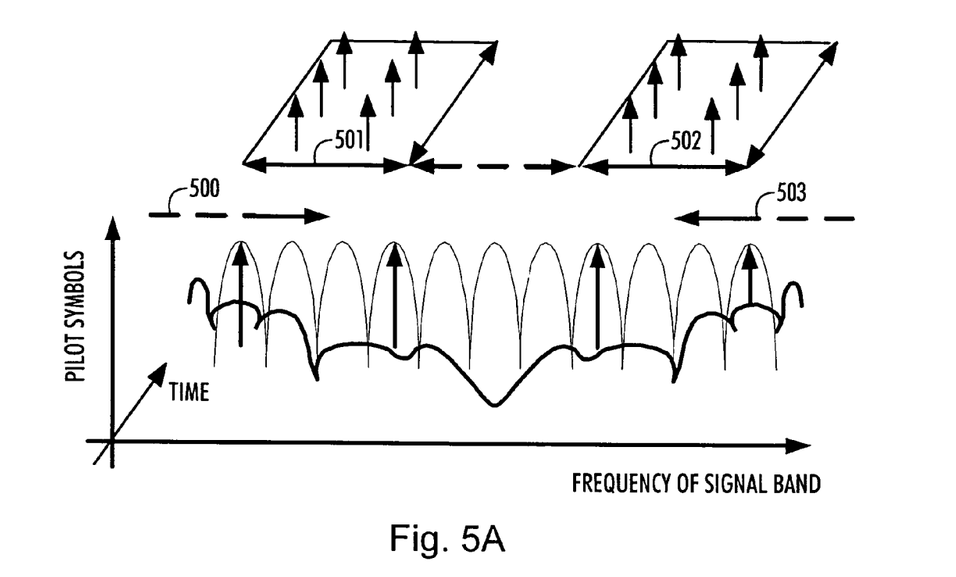
FIG. 5A illustrates pilot energy distribution over the system bandwidth.

FIG. 5A illustrates pilot energy distribution over the system bandwidth. The x axis represents the frequency of the signal band and the y axis represents the pilot symbols. Interpolation both in time and frequency (501 and 502, dual-sided time interpolation and dual-sided frequency interpolation) are available for channel estimation of the sub-carriers. Actually, in the safe band, the interpolation can be dual-sided both in time and in frequency, but in the suppression band, the sub-carriers at the end of the band may only benefit of dual-sided time interpolation and single-sided (or limited) frequency interpolation (500 and 503). Extrapolation in time and/or frequency beyond the positions of the pilot symbols is of course feasible also. This will, however, lead to a small decrease in channel estimation accuracy.

Figure 5B:
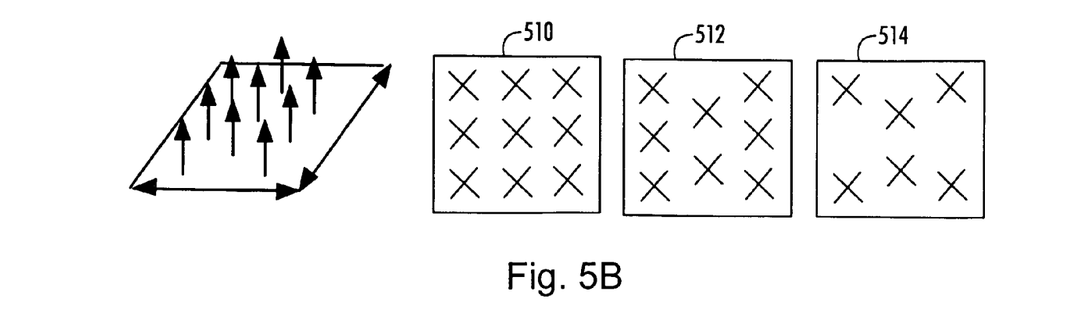
FIG. 5B illustrates examples of time-frequency patterns of pilot symbols.

FIG. 5B illustrates examples of time-frequency patterns of pilot symbols. The squares with X's 510, 512, 514 represent different examples of time-frequency patterns of the pilot symbols. Without the loss of generality, the pilot symbol positions in a pattern need not be constant, but alternatively hopping patterns may be applied such that from frame to frame the positions of the pilot symbols in a pattern are shifted, rotated or hopped in time and/or frequency. The properties of pilot density are anyhow maintained in these rotational operations.

Figure 6:
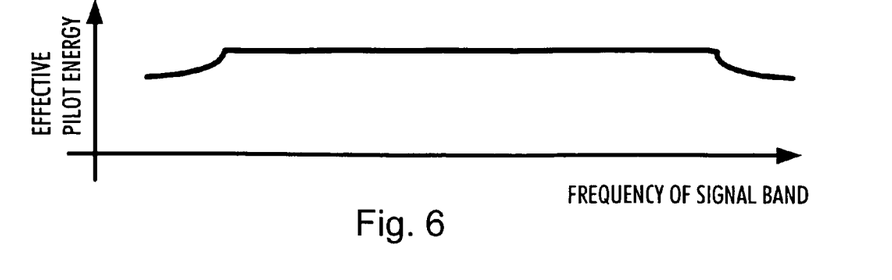
FIG. 6 illustrates expected effective pilot energy distribution over the system bandwidth.

FIG. 6 illustrates the expected effective pilot energy distribution over the system bandwidth. The x axis represents the frequency of the signal band and the y axis represents the effective pilot energy density.

Figure 7:
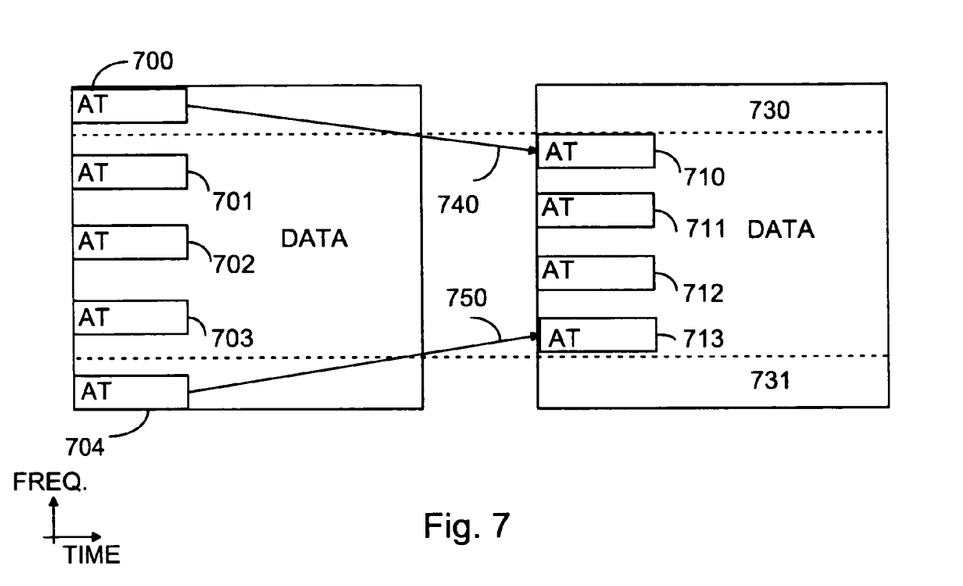
FIGS. 7 and 8 illustrate examples of embodiments of the invention for TDM multiplexed and FDM multiplexed Allocation Table structures, respectively.
Figure 8:
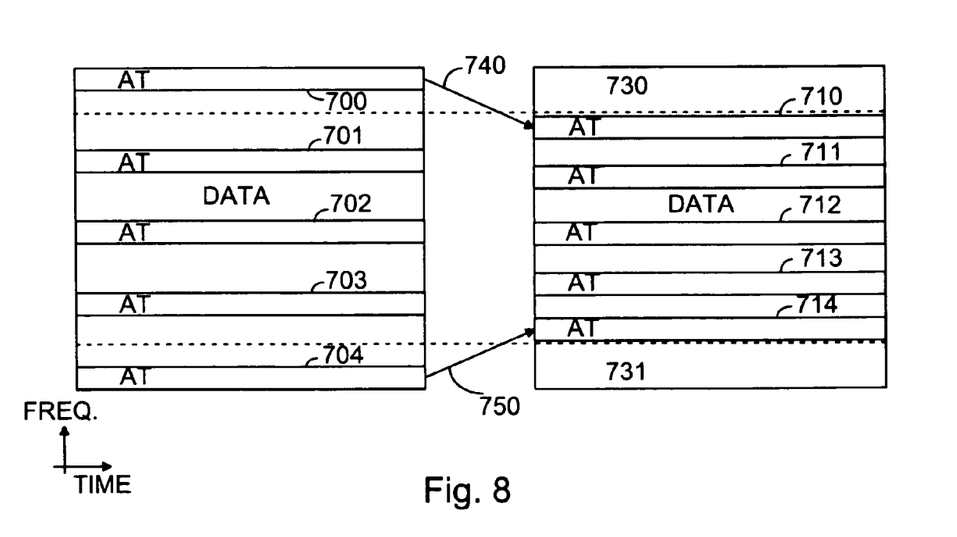

FIGS. 7 and 8 illustrate examples of embodiments of the invention for time-division multiplexed (TDM) and frequency-division multiplexed (FDM) Allocation Table structures respectively. Besides time-division multiplexed and frequency-division multiplexed Allocation Table structures, also code division multiplexed, or any combination thereof, can be used. The left-hand parts of the FIGS. 7 and 8 describe situations where the allocation information 700-704 is allocated over the whole bandwidth including the sub-carriers in the suppression bands, 730 and 731. In an embodiment, the sub-carriers at the edge of the bandwidth (suppression bands 730, 731) are defined not to carry symbols of the shared signaling channel (the Allocation Table). The arrows 740, 750 are for illustrating how the allocation of the allocation information may be configured to change due to the safe band. The right-hand parts of the FIGS. 7 and 8 illustrate examples of the Allocation Table structure 710-714 when the sub-carriers in the suppression bands do not carry allocation information. However, it is possible that allocation information for user terminals with good channel conditions is still allocated to the sub-carriers included in the suppression bands although it is not shown in these figures.

The described embodiments may require changes in construction of the code block structure of the Allocation Table and its mapping to the physical sub-carrier resources. This may be signaled in the system info or in the category 0 information of the Allocation Table, for example. Category 0 information is common information that defines at least one of a structure of a control channel and its critical transport parameters. It can also be determined (e.g. in category 0) that the defined Allocation Table formats shall avoid using certain sub-carrier indexes.

The embodiments of the invention may be realized in an electronic device, comprising a controller. The controller may be configured to perform at least some of the steps described in connection with the flowchart of FIG. 3 and in connection with FIGS. 2, 4 to 8. The embodiments may be implemented as a computer-readable program comprising instructions for executing a computer process for resource allocation.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

The techniques described herein may be implemented by various means. For example, these techniques may be implemented in hardware (one or more devices), firmware (one or more devices), software (one or more modules), or combinations thereof. For a hardware implementation, the processors used for channel estimation may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For a firmware or software, implementation can be through modules (e.g., procedures, functions, and so on) that perform the functions described herein. The software codes may be stored in memory unit and executed by the processors. The memory unit may be implemented within the processor or external to the processor, in which case it can be communicatively coupled to the processor via various means as is known in the art. Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Even though the invention has been described above with reference to an example according to the accompanying drawings, it is clear that the invention is not restricted thereto but it can be modified in several ways within the scope of the appended claims.

The invention claimed is:

1. A method, comprising:
   sharing a common frequency band by multiple user terminals, the common frequency band including a plurality of sub-carriers;
   providing signaling information related to the allocation of the plurality of sub-carriers to the user terminals;
   dividing the common frequency band into two suppression bands at the edge zones of the common frequency band and providing a safe band between the two suppression bands, the two suppression bands including sub-carriers having a predetermined amount of decreased channel estimation accuracy compared with the other sub-carriers of the common frequency band; and processing signaling information, related to the allocation of at least one sub-carrier to a user terminal having an expected signal to interference-plus-noise ratio at a predetermined level, on at least one sub-carrier included in the safe band.

2. The method of claim 1, further comprising processing signaling information related to a user terminal having an expected signal to interference-plus-noise ratio below a predetermined threshold on at least one sub-carrier included in the safe band.

3. The method of claim 1, further comprising processing signaling information related to a user terminal having an expected signal to interference-plus-noise ratio above a predetermined threshold on a set of sub-carriers included at least partly in a suppression band.

4. The method of claim 1, further comprising: applying a smooth weighting function over the sub-carriers when dividing the common frequency band into two suppression bands and providing the safe band between the two suppression bands.

5. The method of claim 1, further comprising including the signaling information related to the allocation of the plurality of sub-carriers in an Allocation Table.

6. The method of claim 5, wherein the signaling information related to the allocation of a sub-carrier to a user terminal having a low expected signal to interference-plus-noise ratio is included in a code block of the Allocation Table.

7. The method of claim 5, wherein the Allocation Table structure is time-division multiplexed, frequency-division multiplexed, code division multiplexed or any combination thereof.

8. The method of claim 1, further comprising: determining the amount of decreased channel estimation accuracy of the sub-carriers on the basis of a channel estimation algorithm.

9. The method of claim 1, further comprising: calculating an update of a correction factor or a bias to the channel estimation process and applying the calculated update in the allocation control.

10. The method of claim 1, further comprising: controlling transmission power of the sub-carriers based on the processing of the signaling information.

11. The method of claim 1, further comprising: adjusting a selected channel coding rate between a lower rate and a higher rate on the basis of the processing of the signaling information.

12. A communication system, comprising a network infrastructure comprising:
a transmitter configured to transmit signaling information to user terminals, the signaling information being related to the allocation of the plurality of sub-carriers at a common frequency band used for data transmission between the multiple user terminals and the network infrastructure;
a processor configured to divide the common frequency band into two suppression bands at the edge zones of the common frequency band and to provide a safe band between the two suppression bands, the two suppression bands including sub-carriers having a predetermined amount of decreased channel estimation accuracy compared with the other sub-carriers of the common frequency band; and
a processor configured to allocate signaling information, related to the allocation of at least one sub-carrier to a user terminal having an expected signal to interference-plus-noise ratio at a predetermined level, to at least one sub-carrier included in the safe band.

13. The system of claim 12, wherein the processor is configured to allocate signaling information for a user terminal having an expected signal to interference-plus-noise ratio below a predetermined threshold to at least one sub-carrier included in the safe band.

14. The system of claim 12, wherein the processor is configured to allocate signaling information for a user terminal having an expected signal to interference-plus-noise ratio above a predetermined threshold to a set of sub-carriers included at least partly in a suppression band.

15. The system of claim 12, wherein the processor is configured to apply a smooth weighting function over the sub-carriers when dividing the common frequency band into two suppression bands and providing the safe band between the two suppression bands.

16. The system of claim 12, wherein the processor is configured to include the signaling information related to the allocation of the plurality of sub-carriers in an Allocation Table.

17. The system of claim 12, wherein the processor is configured to determine the amount of decreased channel estimation accuracy of the sub-carriers on the basis of a channel estimation algorithm.

18. The system of claim 12, wherein the processor is configured to control the transmission power of the sub-carriers based on the allocation of the signaling information.

19. The system of claim 12, wherein the processor is configured to adjust a selected channel coding rate between a lower rate and a higher rate on the basis of the allocation of the signaling information.

20. An apparatus, comprising:
at least one processor; and
at least one memory including computer program code,
wherein the at least one memory and the computer program code are configured to, with the at least one processor, cause the apparatus at least to
transmit signaling information to user terminals, the signaling information being related to the allocation of the plurality of sub-carriers at a common frequency band used for data transmission between the multiple user terminals and a network infrastructure,
divide the common frequency band into two suppression bands at the edge zones of the common frequency band and to provide a safe band between the two suppression bands, the two suppression bands including sub-carriers having a predetermined amount of decreased channel estimation accuracy compared with the other sub-carriers of the common frequency band, and
allocate signaling information, related to the allocation of at least one sub-carrier to a user terminal having an expected signal to interference-plus-noise ratio at a predetermined level, to at least one sub-carrier included in the safe band.

21. The apparatus of claim 20, wherein the at least one memory and the computer program code are further configured to, with the at least one processor, cause the apparatus at least to allocate signaling information for a user terminal having an expected signal to interference-plus-noise ratio below a predetermined threshold to at least one sub-carrier included in the safe band.

22. The apparatus of claim 20, wherein the at least one memory and the computer program code are further configured to, with the at least one processor, cause the apparatus at least to allocate signaling information for a user terminal having an expected signal to interference-plus-noise ratio above a predetermined threshold to a set of sub-carriers included at least partly in a suppression band.

23. The apparatus of claim 20, wherein the at least one memory and the computer program code are further configured to, with the at least one processor, cause the apparatus at least to include the signaling information related to the allocation of the plurality of sub-carriers in an Allocation Table.

24. The apparatus of claim 20, wherein the at least one memory and the computer program code are further configured to, with the at least one processor, cause the apparatus at least to determine the amount of decreased channel estimation accuracy of the sub-carriers on the basis of a channel estimation algorithm.

25. The apparatus of claim 20, wherein the at least one memory and the computer program code are further configured to, with the at least one processor, cause the apparatus at least to control the transmission power of the sub-carriers based on the allocation of the signaling information.

26. The apparatus of claim 20, wherein the at least one memory and the computer program code are further configured to, with the at least one processor, cause the apparatus at least to adjust a selected channel coding rate between a lower rate and a higher rate on the basis of the allocation of the signaling information.

27. The apparatus of claim 20, wherein the apparatus is a network element.

28. An apparatus, comprising:
at least one processor, and
at least one memory including computer program code,
wherein the at least one memory and the computer program code are configured to, with the at least one processor, cause the apparatus at least to
receive signaling information related to the allocation of a plurality of sub-carriers of a common frequency band, where the common frequency band is divided into two suppression bands at the edge zones of the common frequency band and a safe band is provided between the two suppression bands, the two suppression bands including sub-carriers having a predetermined amount of decreased channel estimation accuracy compared with the other sub-carriers of the common frequency band, and
receive signaling information allocated to at least one sub-carrier included in the safe band when the user terminal has an expected signal to interference-plus-noise ratio at a predetermined level.

29. The apparatus of claim 28, wherein the at least one memory and the computer program code are further configured to, with the at least one processor, cause the apparatus at least to receive the signaling information related to the allocation of the plurality of sub-carriers included in an Allocation Table.

30. A non-transitory computer-readable medium comprise a computer program product, the computer program product being configured to control a processor to perform:
sharing a common frequency band by multiple user terminals, the common frequency band including a plurality of sub-carriers;
providing signaling information related to the allocation of the plurality of sub-carriers to the user terminals;
dividing the common frequency band into two suppression bands at the edge zones of the common frequency band and providing a safe band between the two suppression bands, the two suppression bands including sub-carriers having a predetermined amount of decreased channel estimation accuracy compared with the other sub-carriers of the common frequency band; and
processing signaling information, related to the allocation of at least one sub-carrier to a user terminal having an expected signal to interference-plus-noise ratio at a predetermined level, on at least one sub-carrier included in the safe band.

31. The computer program product of claim 30, wherein the non-transitory computer-readable medium comprises at least one of the following media: a computer-readable program distribution medium, a program storage medium, a record medium, a computer readable memory, a computer readable software distribution package, and a computer readable compressed software package.

32. A method, comprising:
receiving signaling information related to the allocation of a plurality of sub-carriers of a common frequency band, where the common frequency band is divided into two suppression bands at the edge zones of the common frequency band and a safe band is provided between the two suppression bands, the two suppression bands including sub-carriers having a predetermined amount of decreased channel estimation accuracy compared with the other sub-carriers of the common frequency band, and
receiving signaling information allocated to at least one sub-carrier included in the safe band when the user terminal has an expected signal to interference-plus-noise ratio at a predetermined level.

33. The method of claim 32, wherein the receiving comprises receiving the signaling information related to the allocation of the plurality of sub-carriers included in an Allocation Table.

34. An apparatus, comprising:
transmitting means for transmitting signaling information to user terminals, the signaling information being related to the allocation of the plurality of sub-carriers at a common frequency band used for data transmission between the multiple user terminals and a network infrastructure;
processing means for dividing the common frequency band into two suppression bands at the edge zones of the common frequency band and for providing a safe band between the two suppression bands, the two suppression bands including sub-carriers having a predetermined amount of decreased channel estimation accuracy compared with the other sub-carriers of the common frequency band; and
processing means for allocating signaling information, related to the allocation of at least one sub-carrier to a user terminal having an expected signal to interference-plus-noise ratio at a predetermined level, to at least one sub-carrier included in the safe band.

35. The apparatus of claim 34, further comprising processing means for including the signaling information related to the allocation of the plurality of sub-carriers in an Allocation Table.

36. An apparatus, comprising:
receiving means for receiving signaling information related to the allocation of a plurality of sub-carriers of a common frequency band, where the common frequency band is divided into two suppression bands at the edge zones of the common frequency band and a safe band is provided between the two suppression bands, the two suppression bands including sub-carriers having a predetermined amount of decreased channel estimation accuracy compared with the other sub-carriers of the common frequency band; and
receiving means for receiving signaling information allocated to at least one sub-carrier included in the safe band when the user terminal has an expected signal to interference-plus-noise ratio at a predetermined level.

37. The apparatus of claim 26, wherein the signaling information related to the allocation of the plurality of sub-carriers is included in an Allocation Table.

* * * * *